US 8,056,059 B2

(12) United States Patent
Chockler et al.

(10) Patent No.: US 8,056,059 B2
(45) Date of Patent: Nov. 8, 2011

(54) USING CROSS-ENTROPY TO TEST EXECUTABLE LOGIC CODE

(75) Inventors: Hana Chockler, Haifa (IL); Eitan Daniel Farchi, Pardes Hana (IL); Benyamin Godlin, Jerusalem (IL); Sergey Novikov, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/873,447

(22) Filed: Oct. 17, 2007

(65) Prior Publication Data

US 2009/0106737 A1   Apr. 23, 2009

(51) Int. Cl.
*G06F 9/44* (2006.01)
*G06F 17/00* (2006.01)
*G06F 15/173* (2006.01)

(52) U.S. Cl. .......... 717/126; 717/104; 717/132; 706/46; 709/224

(58) Field of Classification Search .................. None
See application file for complete search history.

(56) References Cited

U.S. PATENT DOCUMENTS

| | | | | |
|---|---|---|---|---|
| 6,128,773 A * | 10/2000 | Snider | .......................... | 717/132 |
| 7,174,554 B2 | 2/2007 | Pierce et al. | | |
| 7,526,751 B2 * | 4/2009 | Sundresh | ...................... | 717/104 |
| 7,640,537 B2 * | 12/2009 | Simkins | ......................... | 717/126 |
| 7,783,745 B1 * | 8/2010 | Bhargava et al. | ............. | 709/224 |
| 2004/0254903 A1 * | 12/2004 | Heckerman et al. | ............ | 706/46 |

OTHER PUBLICATIONS

"Cross-Entropy Based Testing", Chockler et al., 2007, pp. 101-108, <http://ieeexplore.ieee.org/xpls/abs_all.jsp?arnumber=4401988>.*
"Cross-entropy and rare events for maximal cut and partition problems", R. Rubinstein, Jan. 2002, pp. 27-53, <http://delivery.acm.org/10.1145/520000/511444/p27-rubinstein.pdf>.*
"Rare event simulation and combinatorial optimization using cross entropy: estimation of rare event probabilities using cross-entropy", Homem-de-Mello et al., Dec. 2002, pp. 310-319, <http://delivery.acm.org/10.1145/1040000/1030499/p310-homem-de-mello.pdf>.*
"Cross-entropy and estimation of probabilistic context-free grammars", Corazza et al., Jun. 2006, pp. 335-342, <http://delivery.acm.org/10.1145/1230000/1220878/p335-corazza.pdf>.*

* cited by examiner

*Primary Examiner* — Thuy Dao
(74) *Attorney, Agent, or Firm* — Jason Far-Hadian

(57) ABSTRACT

A method for detecting the occurrence of rare events in an executable logic code includes assigning a first probability of a chance of traversal of one or more decision paths, in which each path connects two decision points defined by execution of the logic code. As a result of execution of the logic code, the decision paths traversed are evaluated to determine whether said traversal conforms to a predefined performance function. The performance function defines a goal to be achieved pursuant to the execution of the logic code. A second probability is assigned to the chance of traversal of at least one of said one or more decision paths to increase the likelihood that the one or more decision paths are traversed in a subsequent execution of the logic code in a closer conformity with the predefined performance function.

20 Claims, 3 Drawing Sheets

USING CROSS-ENTROPY TO TEST EXECUTABLE LOGIC CODE

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to testing large programs and, more particularly, to a method for testing large programs using a cross-entropy scheme.

BACKGROUND

Exhaustive testing of a commercially written program code that has thousands of lines of codes and multitudes of execution paths is very challenging, particularly when there are a large number of nested loops and conditional branches (i.e., interleavings) in the logic code.

Complex programs are commonly tested by way of non-exhaustive testing methods, such has simulation and verification. Simulation and verification techniques are generally based on a heuristic approach which is efficient in determining most errors in typical programs, but does not guarantee discovery of all errors (i.e., bugs). Simulation-based verification is traditionally used to verify the correctness of a program with respect to a set of input values. Different input values can induce a different execution path for the program under test.

Execution of a program in a certain path is considered to be correct, if the program behaves as required (i.e., produces the expected output) for all possible input values for that path. Ideally, a complete verification will test all execution paths in a program, using all possible input values for each path. Obviously, this approach is very time consuming and expensive, if not impractical.

A more practical testing option focuses on discovering bugs that manifest themselves when the computing system is subjected to a heavy computational load during runtime (i.e., stress-testing). Another practical approach involves creating random interference in an event scheduler which leads to randomized interleavings in execution paths.

The interference is created by injecting noise to the scheduler forcing the scheduler to create uncommon interleavings, which are rare during usual execution. However, a chance of finding a very rare bug or a defective program routine that is only very rarely initiated is small, since the random distribution created by injecting noise cannot be adjusted to a specific pattern.

The most commonly used method to maximize the exhaustiveness of testing is coverage estimation. There is an extensive simulation-based verification research on coverage metrics, which provides a measure for determining the exhaustiveness of a test. Coverage metrics are used in order to monitor progress of the verification process, estimate whether more input sequences are needed, and whether direct simulation towards unexplored areas of the program are required.

In the related art systems, the metrics measure the part of the design that has been activated by the input sequences. For example, code-based coverage metrics measure the number of code lines executed during the simulation. There is a variety of different metrics used in coverage estimation, and they play an important role in the design validation effort. Still, since there is no special effort directed to a possibly erroneous pattern in the code, rare bugs can remain undetected even after testing has reached a high degree of coverage.

Thus, software testing and verification methods and systems are needed that can overcome the aforementioned shortcomings by directing code testing according to performance measures that enhance identification of bugs, especially those of the rare event type.

SUMMARY

The present invention is directed to systems, methods and corresponding products that facilitate testing and verification of large programs.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for testing and verification of large programs is provided. The method comprises determining the existence of a program bug that rarely manifests itself by executing the program many times where, in each execution, the path selection between decision nodes, scheduling and delay are updated based on whether the distribution of the generated results conform to a predefined performance function. The performance function is utilized to measure the outcome of each test execution based on maximizing the occurrence of a rare event that constitutes a hard to discover error in the program during normal execution. When the performance function distribution narrows below a selected statistical deviation in successive runs, such that further iteration adds little new information, the test is considered completed.

If each decision point in the program under test is represented by a node, an execution path (or edge) represents the route from one node to the next. A decision point is a point in the execution where the next action is chosen among two or more possible actions, due to concurrency, different inputs, or otherwise non-deterministic decisions. The probability of execution for each path at a node can be defined by values stored in a probability distribution table. Initially, a uniform random or equal chance of execution may be assigned to each path at various nodes. Thereafter, a cross-entropy method may be used to update the probability of execution for each path to optimize occurrence of the rare event, according to a predetermined performance function that provides a measure for how the result of execution in each path conforms to the goal defined by the performance function.

In accordance with one embodiment, a method for detecting the occurrence of rare events in an executable logic code comprises assigning a first probability of a chance of traversal of one or more decision paths, in which each path connects two decision points defined by execution of a logic code. The one or more decision paths traversed and the output are evaluated as a result of execution of the logic code, to determine whether said traversal conforms to a predefined performance function. The predefined performance function defines a goal to be achieved pursuant to the execution of the logic code. A second probability is assigned to the chance of traversal of at least one of said one or more decision paths to increase the likelihood that the one or more decision paths are traversed in a subsequent execution of the logic code in a closer conformity with the predefined performance function.

In accordance with one aspect of the invention, a computer program product comprising a computer useable medium having a computer readable program is provided. The computer readable program when executed on a computer causes the computer to perform the functions and operations associated with the above-disclosed methods. In yet another embodiment, a system comprising one or more logic units is provided. The one or more logic units are configured to perform the functions and operations associated with the above-disclosed methods.

In an exemplary embodiment, a system for detecting the occurrence of rare events in an executable logic code comprises a logic unit for executing the logic code under test, and a logic unit for monitoring the execution progress. The system may further comprise an initializer for assigning a first probability of a chance of traversal to one or more decision paths, in which each path connects two decision points defined by execution of the logic code; an evaluator for evaluating one or more decision paths traversed, as a result of execution of the logic code, to determine whether said traversal conforms to a predefined performance function.

The exemplary embodiment may further comprise an updater to calculate a second probability of the chance of traversal of at least one of said one or more decision paths to increase the likelihood that the one or more decision paths are traversed in a subsequent execution of the logic code in a closer conformity with the predefined performance function; and a decider that chooses the next path to run according to the current probability of the chance of traversal of at least one of said one or more decision paths, and provides a mutual exclusion condition notice concerning the execution of two or more paths of the logic code under test.

In certain exemplary embodiments, the system may also comprise an instumentor for implementing callbacks at synchronization points of the logic code under test; and a stopper that obtains a mutual exclusion condition for each executable path based on the callbacks from the instumentor.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate testing large programs, preferably using a cross-entropy scheme.

In the following, numerous specific details are set forth to provide a thorough description of various embodiments. Certain embodiments may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
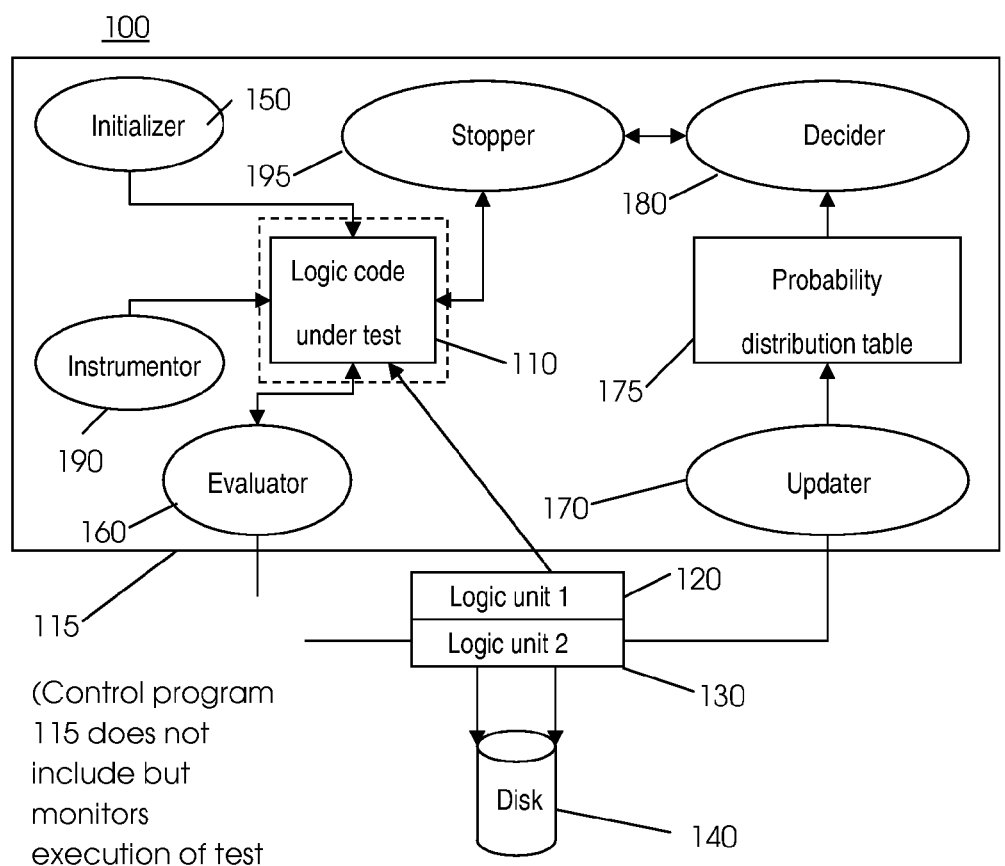
FIG. 1 is a block diagram of a system for testing programs, in accordance with one embodiment.

Referring to FIG. 1, system 100 comprises hardware and software components for testing a program in conformity with a performance function as provided in further detail below. As shown, a control program 115 is configured to monitor a logic code under test (hereafter test code) 110. A first logic unit 120 may be provided for executing test code 110, and a second logic unit 130 for running control program 115 to monitor the execution progress of test code 110. Depending on implementation, the first and second logic units 120, 130 may be implemented in a single or more than two logic units, for example. Memory 140 may be also provided for storing at least one of test code 110, control program 115, and data generated during the execution of test code 110.

Test code 110 may be implemented such that, when executed, one or more decision points (i.e., nodes) are encountered. At each node, a decision is made to branch out via one or more paths (i.e., edges) to other nodes in test code 110. Decisions are made at each node concerning which path to follow. In one embodiment, execution of test code 110 involves the concurrent processing of several threads where, in accordance with one embodiment, control program 115 is implemented to control execution progress of test code 110 and measure characteristics of the resulting execution paths to determine the degree of conformance of the results to a predetermined performance function.

The performance function may be configured to provide guidance for searching for executions path that result in rare occurrences based on a probability distribution assigned to each path at a node. The probability distribution for available paths in each node may be evaluated based on the conformity of results with a performance function according to a cross-entropy scheme. Cross-entropy is a technique highly adapted to rare event simulation and is used for identifying the paths to an event with a very small probability of occurrence. A rare event is an event that does not occur very often when choices are made randomly at each decision point during the execution of a program.

As provided in further detail below, cross-entropy is preferably used to minimize the number of executions needed to converge on a set of execution paths during execution of test code 110. That is, cross-entropy helps to rapidly reduce the difference between successive probability distributions for various paths in order to rapidly converge on the behavior of test code 110 toward a closer conformity with the performance function.

Referring back to FIG. 1, control program 115 may be configured to update the probability for traversal of different paths at each node to encourage rapid convergence toward execution paths that satisfy or more closely conform to the performance function. Accordingly, control program 115 is configured to amplify the likelihood of triggering rare occurrences and revealing the conditions under which such occurrences may take place by monitoring and influencing the execution paths chosen during the various iterations for test code 110.

In an exemplary embodiment, control program 115 may comprise an initializer 150, an evaluator 160, an updater 170, a decider 180, an instrumentor 190 and a stopper 195. Said components of control program 115 may be implemented in form of software, hardware or a combination thereof depending on implementation. Initializer 150 provides input and assigns a first probability distribution for traversal of various paths at each node during execution of test code 110. The probability distribution for each path may be stored in a probability distribution table 175. Depending on implementation, the initial probability distribution for each path may be, for example, equally divided among all paths for each node. Alternatively, the probability distribution may be unequally divided among different paths according to a predetermined distribution factor.

Evaluator 160 is configured to evaluate one or more decision paths traversed during execution of test code 110 to determine whether the path traversal conforms to a predefined performance function. Updater 170 may be configured to update the probability distribution for traversal of one or more of paths available at a node during subsequent executions of test code 110. Probability distribution values for one or more paths may be stored in memory 140 in a probability distribution table 175, for example, corresponding to the execution history of test code 110.

Probability distribution assigned to a path at a node defines the likelihood for choosing that path over another at the respective node, if that node is traversed during execution of test code 110. For example, based on the results obtained by evaluator 160, a certain path at a selected node may be assigned a low (e.g., zero) probability of execution, thus effectively reducing (or eliminating) the chance that the first path will be selected during the next execution. Alternatively, a second path at the same node may be assigned an amplified (e.g., 100%) likelihood of execution, thus enhancing (or guaranteeing) the chances that said path is selected during the next test execution.

The probability of execution for some paths in a node may be higher, when the assigned probability for execution of another path for the same node has been reduced. For example, where the assigned probability is distributed among two paths as 50-50, if the probability for one is reduced to 25%, the probability for the other may be enhanced to 75%. By updating and adjusting the probability distribution for different paths at each node, control program 115 provides an approach conducive to the rapid convergence of the behavior of test code 110 towards execution results that are advantageously in closer conformity with a predefined performance function at each subsequent execution.

Based on probability distribution generated by updater 170, decider 180 may select the paths that will be executed during the next execution, while instrumentor 190 implements callbacks at synchronization points of test code 110. Stopper 195 may obtain mutually exclusive conditions for each executable path based on the callbacks from instrumentor 190. For example, on a call from instrumentor 190, stopper 195 may allow decider 180 to choose the path to be executed. If the path selected by decider 180 is not the one called, stopper 195 may delay the execution of the selected path. In one embodiment, stopper 195 is configured to determine which path may be executed at an instance of execution of test code 110, based on callbacks provided by instrumentor 190.

Figure 2:
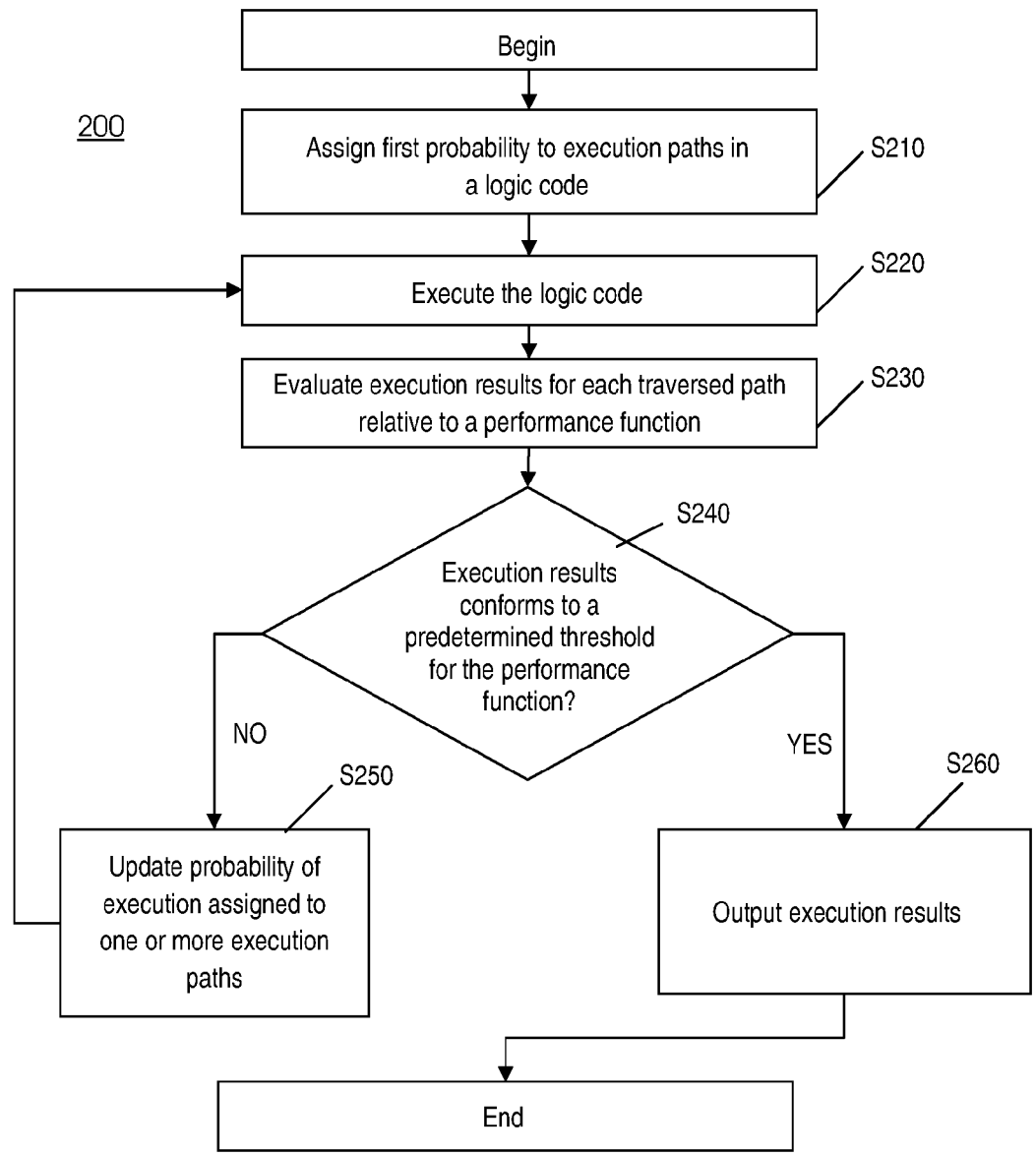
FIG. 2 is a flow diagram of a method for testing programs, in accordance with one embodiment.

FIG. 2 is a flow diagram of a method 200 for testing an exemplary logic code (e.g., test code 110), in accordance with one embodiment. Referring to FIGS. 1 and 2, initializer 150 assigns a probability to one or more execution paths for one or more nodes in test code 110 (S210). As noted earlier, the assigned probability value to each path identifies the chance of traversal for that path in relation to other possible paths that may be available for traversal at a node in test code 110. During an initialization process, the assigned probability may be equally divided among all paths in a node. For example, in a node where four decision paths may be traversed, the assigned probability to each path may be 25%.

After providing a selected input and assigning the probability distribution to one or more paths in test code 110, initializer 150 executes test code 110 (S 220). Execution of test code 110 generates an execution path history and an output corresponding to the provided input. Evaluator 160 evaluates execution results for each traversed path relative to a performance function (S230). Evaluator 160 determines whether the execution results conform to a predefined threshold for the performance function.

The performance function defines a goal to be achieved pursuant to the execution of test code 110. The predetermined threshold is reached when updating the distribution probability for the paths in subsequent executions will likely not lead to a closer conformity of the results with the performance function. Evidence that conformity is achieved may be demonstrated by a stable distribution in the execution results obtained during further execution of test code 110. For example, if evaluator 160 detects that the statistical distribution of output results, obtained from successive execution of test code 110, are narrower than a predetermined threshold (e.g., maximum spread) then it is determined that a closer conformity with the performance function may not be achieve regardless of how many more times test code 110 is executed.

If the execution results do not conform to the predetermined threshold, updater 170 may update the probability of execution for one or more paths in one or more nodes of test case 110 in order to increase the likelihood that the one or more decision paths are traversed in a subsequent execution of test code 110 in closer conformity with the predefined performance function (S250). In some embodiments, updater 170 performs the updating function in accordance with values stored in probability distribution table 175 by decider 180. Decider 180 assigns the probability distribution value according to results provided by evaluator 160 to improve the subsequent results of execution of test code 110 in closer conformity with the predefined performance function.

In an exemplary embodiments, a cross-entropy scheme is utilized to select some percentage (e.g., approximately 15%) of best samples generated as the result of execution of test code 110, according to the conformity of such samples to the performance function. In such example embodiment, updater 170 may update values in probability distribution table 175 to imitate the parameters that generated the best samples. This approach minimizes the cross-entropy divergence between the previous distribution and the one which encompasses the selected samples.

Once updater 170 has updated probability distribution table 175, control software 115 continues to monitor execution of test code 110 according to the updated probability distribution values, and to evaluate the result; and if needed update the values in probability distribution table 175 (S220-S250) until evaluator 160 determines that the execution results conform to the predetermined threshold for the predefined performance function. If so, then control program 115 outputs the execution results for test code 110 for further evaluation by an independent decision maker, such as a human operator, for example (S260).

The above method can be used to focus the executions on patterns for which reasonable metrics can be defined. The following is a partial list of patterns or potential bugs which may be tested using the cross-entropy scheme:

1. Buffer Overflow: The number of the messages in a buffer, with respect to the buffer's maximum capacity, can be used for detecting buffer overflow problems.
2. Deadlock: The number of locks simultaneously taken and not released during execution can be used for detecting deadlocks.
3. Rare Data: The number of shared resources accessed on an execution path can be used for detecting rare data races.
4. Several Consecutive Errors: The number of error paths (e.g., throw exceptions) executed can be used for detecting bugs or leaks which appear only in extreme situations of several consecutive errors.
5. Synchronization Primitives: The number of mutually exclusive functions traversed in an execution path can be used to reveal bugs caused by bad understanding of the synchronization primitives.
6. Wait Notify: The number of lost notifies can be used to find wait-notify bugs.
7. Task Failures or Cancellations: The number of canceled threads or tasks can be used to detect bad recovery from task failures and cancellations.

Figure 3:
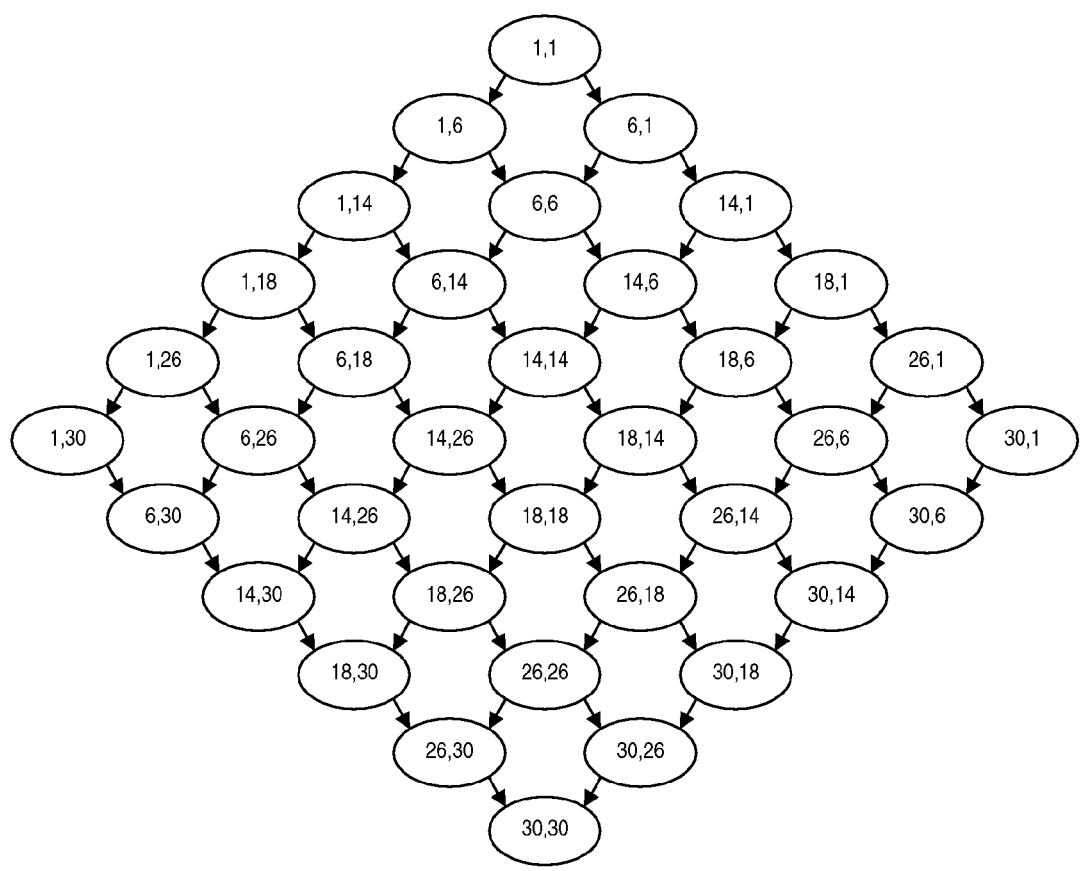
FIG. 3 is an execution graph corresponding to exemplary execution paths traversed as the result of execution of the logic code illustrated in Table 1.

Table 1 blow is an example of a control program for detecting buffer overflow problems, according to one embodiment. The numbers on the left are the line numbers and they appear in the nodes of FIG. 3, which is a diagram illustrating the possible paths traversed during execution of an example test code 110 based on the exemplary control program in Table 1. Under testing conditions, the paths taken from (1,1) to (30,30) may be pruned using cross-entropy according to method 200 to force the occurrence of a rare event, such rare event in this example being a buffer overflow.

TABLE 1

Example test code - Stack Overflow with A and B threads

The original code of each thread:
```
1:    stopper.startThreadCB(this);
2:    myName = getName( );
3:    for(int i=0;i<2;i++)
4:    {
5:      stopper.lockCB(this);
6:      {
7:        // check top of stack - if it is not myName then push:
8:        if (next == 0 || !data[next−1].equals(myName))
9:          ret = push(myName);
10:       else
11:         pop( );
12:     }
13:     stopper.unlockCB(this);
14:   }
15:   stopper.endThreadCB(this);
===================================
```
The same code in unwound form:
```
1:    stopper.startThreadCB(this);
2:    myName = getName( );
3:    i=0;
4:    if (i<2)
5:    {
6:      stopper.lockCB(this);
7:      {
8:        // check top of stack - if it is not myName then push:
9:        if (next == 0 || !data[next−1].equals(myName))
```

TABLE 1-continued

Example test code - Stack Overflow with A and B threads

```
10:       ret = push(myName);
11:     else
12:       pop( );
13:   }
14:   stopper.unlockCB(this);
15:   i++;
16:   if (i<2)
17:   {
18:     stopper.lockCB(this);
19:     {
20:       // check top of stack - if it is not myName then push:
21:       if (next == 0 || !data[next−1].equals(myName))
22:         ret = push(myName);
23:       else
24:         pop( );
25:     }
26:     stopper.unlockCB(this);
27:     i++
28:   }
29:   }
30:   stopper.endThreadCB(this);
```

In the above example, the result obtained may show that the number of elements stored in a buffer elements have surpassed a target threshold. If such results are obtained, then it is an indication a bug is discovered and needs to be fixed. Advantageously, bugs can be discovered at a quicker pace using the cross-entropy method discussed above in comparison to random testing, because at each execution the results are focused on testing those scenarios that are more likely to create a certain result (e.g., buffer overflow), instead of starting with an equal random probability every time the test is run again.

In different embodiments, the systems and methods disclosed herein can be implemented either entirely in the form of hardware or entirely in the form of software, or a combination of both hardware and software elements. For example, system 100 may comprise a controlled computing system environment that can be presented largely in terms of hardware components and software code executed to perform processes that achieve the results contemplated by the system of the present disclosure.

A computing environment in accordance with an exemplary embodiment may be composed of a hardware environment and a software environment. The hardware environment comprises the machinery and equipment that provide an execution environment for the software; and the software provides the execution instructions for the hardware as provided above.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method implemented for execution on one or more controllers for detecting the occurrence of rare events in an executable logic code, the method comprising:

assigning a first probability of a chance of traversal of one or more decision paths, in which each path connects two decision points defined by execution of a logic code;

evaluating one or more decision paths traversed, as a result of execution of the logic code, to determine whether said traversal conforms to a predefined performance function, wherein the performance function defines a goal to be achieved pursuant to the execution of the logic code; and assigning a second probability to the chance of traversal of at least one of said one or more decision paths to increase the likelihood that the one or more decision paths are traversed in a subsequent execution of the logic code in a closer conformity with the predefined performance function.

2. The method of claim 1, further comprising continuing to evaluate one or more decision paths traversed after subsequent executions of the logic to determine whether said traversal more closely conforms to a goal value determined by the predefined performance function.

3. The method of claim 1, further comprising continuing to update the probability associated with the chance of traversal of said one or more decision paths until it is determined that further updating of said probability in subsequent executions will likely not lead to a closer conformity with a goal value defined by the predefined performance function.

4. The method of claim 1, wherein the first probability is almost the same for each of said one or more decision paths.

5. The method of claim 1, wherein the second probability enhances the chance of traversal for those paths that result in a higher conformity with a goal value defined by the predefined performance function.

6. The method of claim 1, wherein the performance function is a measure for occurrence of a rare event resulting from the execution of the program code.

7. The method of claim 1, wherein a cross-entropy technique is applied to minimize number of executions needed for results of execution of the program code to conform to a goal value defined by the performance function at a predetermined level.

8. The method of claim 1, wherein assigning the second probability causes a smaller number of paths to be traversed to achieve a closer conformity with the performance function.

9. A system for detecting the occurrence of rare events in an executable logic code, the system comprising:

a logic unit for executing the logic code under test;

a logic unit for running a control program to monitor the execution progress of the logic code under test, wherein the control program determines whether decision paths traversed, as a result of execution of the logic code, conform to a predefined performance function, wherein the performance function defines a goal to be achieved pursuant to the execution of the logic code;

a memory storage for storing the logic code under test, the control program for monitoring the execution of the logic code under test, and data obtained by the control program during execution of the logic code under test.

10. The system of claim 9, wherein the control program comprises:

an initializer for assigning a first probability of a chance of traversal of one or more decision paths, in which each path connects two decision points defined by execution of a logic code;

an evaluator for evaluating one or more decision paths traversed, as a result of execution of the logic code, to determine whether said traversal conforms to a predefined performance function, wherein the performance function defines a goal to be achieved pursuant to the execution of the logic code; and an updater to calculate a second probability of the chance of traversal of at least one of said one or more decision paths to increase the likelihood that the one or more decision paths are traversed in a subsequent execution of the logic code in a closer conformity with the predefined performance function.

11. The system of claim 9, further comprising a decider that chooses the next path to run according to the current probability of the chance of traversal of at least one of said one or more decision paths, and provides a mutual exclusion condition notice concerning the execution of two or more paths of the logic code under test.

12. The system of claim 11, further comprising an instumentor for implementing callbacks at synchronization points of the logic code under test; and a stopper that obtains a mutual exclusion condition for each executable path based on the callbacks from the instrumentor.

13. The system of claim 9, wherein the first logic unit and the second logic unit are the same logic unit.

14. A computer program product comprising a non-transitory computer useable medium having a computer readable program, wherein the computer readable program when executed on a computer causes the computer to:

assign in a second program under test a first probability of a chance of traversal of one or more decision paths, in which each path connects two decision points defined by execution of a logic code;

evaluate one or more decision paths traversed in the second program, as a result of execution of the logic code, to determine whether said traversal conforms to a predefined performance function, wherein the performance function defines a goal to be achieved pursuant to the execution of the logic code; and assign in the second program under test a second probability to the chance of traversal of at least one of said one or more decision paths to increase the likelihood that the one or more decision paths are traversed in a subsequent execution of the logic code in a closer conformity with the predefined performance function.

15. The computer product of claim 14, further adapted to continue to evaluate in the second program under test one or more decision paths traversed after subsequent executions of the logic to determine whether said traversal more closely conforms to the predefined performance function.

16. The computer product of claim 14, further adapted to continue to update in the second program under test the probability associated with the chance of traversal of said one or more decision paths until it is determined that further updating of said probability in subsequent executions will likely not lead to a closer conformity with the predefined performance function.

17. The computer product of claim 14, further adapted to assign the first probability such that it is almost the same for each of said one or more decision paths.

18. The computer product of claim 14, further adapted to assign the second probability to enhance the chance of traversal for those paths that result in a higher conformity with the predefined performance function.

19. The computer product of claim 14, wherein the performance function is further adapted to measure the occurrence of a rare event resulting from the execution of the program code in the second program under test.

20. The computer product of claim 14, wherein a cross-entropy technique is applied to minimize the number of executions needed of the second program under test for results of execution of the program code to conform with the performance function at a predetermined level.

* * * * *